United States Patent [19]

Mnilk et al.

[11] 4,056,914
[45] Nov. 8, 1977

[54] METHOD AND APPARATUS FOR REMOVING RESIDUE OF FILLING MATERIAL IN MACHINES FOR MANUFACTURING FILLED PLASTIC CONTAINERS

[75] Inventors: Reinhold Mnilk, Dortmund; Manfred Kurreck, Bochum-Weitmar; Wolfgang Tiede, Dortmund, all of Germany

[73] Assignee: Holstein & Kappert Aktiengesellschaft, Dortmund, Germany

[21] Appl. No.: 617,180

[22] Filed: Sept. 26, 1975

[30] Foreign Application Priority Data

Sept. 27, 1974 Germany ............... 2446206

[51] Int. Cl.$^2$ ............... B65B 1/04
[52] U.S. Cl. ............... 53/35; 53/191
[58] Field of Search ............... 53/35, 36, 140, 191; 425/DIG. 207

[56] References Cited

U.S. PATENT DOCUMENTS

| 3,251,915 | 5/1966 | Pechtold | 53/140 X |
|---|---|---|---|
| 3,399,508 | 9/1968 | Frielingsdorf et al. | 53/140 |
| 3,423,902 | 1/1969 | Stroop | 53/140 X |
| 3,464,085 | 9/1969 | Burkett et al. | 53/140 X |
| 3,523,401 | 8/1970 | Hansen | 53/140 X |
| 3,537,133 | 11/1970 | Valyi | 53/140 X |
| 3,726,325 | 4/1973 | Munz | 53/140 X |
| 3,785,116 | 1/1974 | Munz et al. | 53/140 X |

Primary Examiner—Othell M. Simpson
Assistant Examiner—John Sipos
Attorney, Agent, or Firm—Toren, McGeady and Stanger

[57] ABSTRACT

In a machine for the manufacture, filling and closure of plastic containers, undesired residue of the filling material is removed from a filling mandrel which extends into the container to be manufactured by provision of a constriction in the blow molding equipment within which the container is formed. The filling mandrel comprises an enlarged end upon which undesired residue tends to accumulate. The blow mold is formed with a constriction through which the mandrel is withdrawn and by forming a gap between the mandrel and the constriction, which gap is approximately equivalent to the thickness of the container, unwanted residue is automatically stripped from the mandrel as it is withdrawn.

5 Claims, 2 Drawing Figures

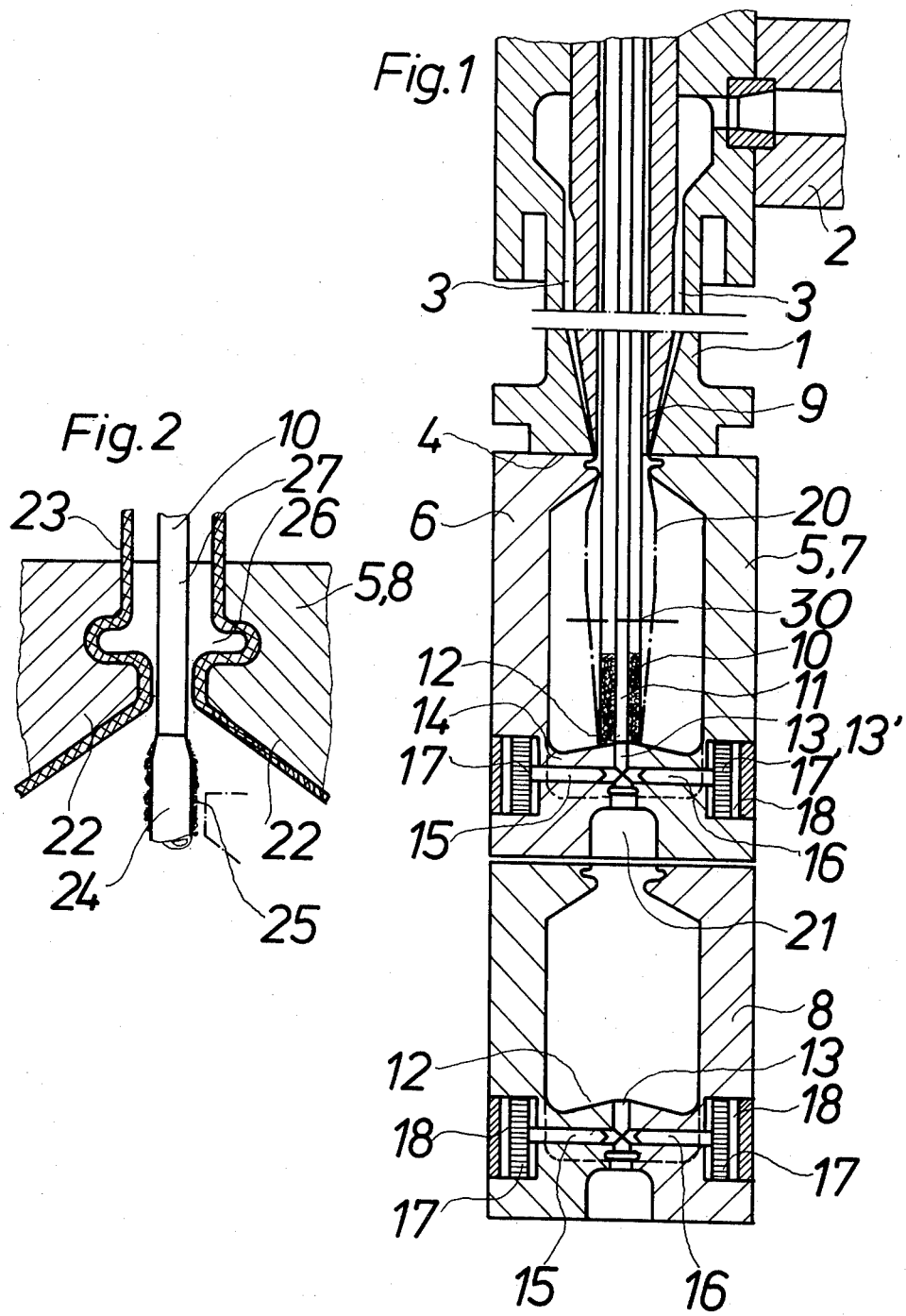

METHOD AND APPARATUS FOR REMOVING RESIDUE OF FILLING MATERIAL IN MACHINES FOR MANUFACTURING FILLED PLASTIC CONTAINERS

BACKGROUND OF THE INVENTION

The invention relates generally to apparatus for manufacturing, filling and closing shipping containers made of synthetic plastic material. More particularly, the invention relates to a method for removing undesired residue of a filling liquid which is inserted by means of a filling mandrel into the shipping container as well as to an apparatus suitable for implementing the method.

In known methods for the continuous manufacture of filled, closed hollow containers of thermoplastic material, a tube or hose made of synthetic plastic material which is extruded while still in a plastic state is enclosed within the forming molds for the container which move at the same velocity as the hose. The hose is inflated into the formed shape in this manner by an increased internal pressure, with the resulting container being filled while a connection with the formed container base is maintained, with a subsequent separating and closing operation being performed by welding after which the container is detached. In addition to this generally known process, further improvements have been developed which consist, however, basically only in a supplement and further development of these known techniques. In all prior art proposals thus far, a filling mandrel is basically used which is insertable through an opening in the head of the mold forming the container, or which is already in position within the mold during the shaping or molding process. When, for example, highly viscous fluids are to be used in the filling operation, difficulties occur due to the fact that as a result of increased adhesive forces, residue of the filling liquid tends to adhere to the surface of the filling mandrel thereby causing difficulties in succeeding molding or forming operations of the container causing unwanted separation of portions of the liquid or other materials. This disadvantage is avoided by presently known state-of-the art techniques by removing the filling mandrel from the container during different stages of the process in accordance with the constantly rising fluid level. Thus, only a small part of the filling mandrel is wetted with the liquid. However, such an approach results in a considerable increase in the cost requirements of the apparatus particularly due to the additional control elements which are necessitated by the requirement for introduction and removal of the filling mandrel. A further disadvantage arises in that a considerable delay can occur in a machine which is required to operate continuously because the insertion and removal of the filling mandrel is time consuming and hence causes a reduction in the output of the machine or in its operating efficiency.

The present invention is intended to avoid these disadvantages while at the same time insuring that in a process of the aforementioned type, despite the rigid connection of the filling mandrel, any filling liquid which remains thereon as a residue will not operate to disturb or unduly influence the succeeding molding or shaping operations.

SUMMARY OF THE INVENTION

In accordance with the present invention, the aforementioned disadvantages are overcome, by a procedure which effects automatic stripping of the residue of the filling material remaining on the outer surface of the filling mandrel during the separation of the filling mandrel from the container with the stripped residue being supplied to the interior of the container which is then made accessible by removal of the mandrel therefrom.

By means of the process of the present invention, a generally trouble-free, continuous molding or shaping process of the container is enabled while avoiding problems which may be caused accumulation of filling material residue which may adhere to the filling mandrel and drop off into the region or zone of the following section of the hose, thereby leaving undesirable and uncontrolled hardening locations.

Accordingly, as a result of the present invention, measures such as the introduction and removal of the filling mandrel during the molding operation, which usually must be performed in known machines, can thereby be avoided.

The apparatus according to the present invention comprises a blow mold which is preferably movable in approximately vertical directions with an extruded hose segment which is formed by an extrusion nozzle supplying the hose section with a filling mandrel being movable to within the blow mold forming the container. The invention is particularly characterized by the fact that the blow mold is formed, preferably in the region above its filling level, with a constriction, the inner surface of the constriction forming with the outer surface of a part of the filling mandrel coming into contact with the filling material an annular or circular gap which corresponds approximately to the wallthickness of the shaped or molded section of the container.

It has proved advantageous in order to enable the annular gap to be adapted to prevailing conditions to provide means for varying the size of the gap. Within the concept of the present invention it is further proposed that the constriction formed in the blow mold be made of an exchangeable or replaceable portion of the mold. In order to implement the molding or shaping of the hose section prior to the stripping off process and in order to accomplish the required ventilation and aeration of the device, it is proposed that in implementing the invention the filling mandrel be formed with a tapered configuration above the maximum filling level with respect to the lower part thereof which forms the annular gap with the inner surface of the constriction.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

IN THE DRAWINGS:

FIG. 1 is a sectional view of the apparatus according to the present invention; and FIG. 2 is an enlarged sectional view of the upper region of the mold.

DETAILED DESCRIPTION OF THE PREFERRED EMBODIMENT

Referring now to the drawing, the apparatus for implementing the process of the present invention is shown as comprising an extrusion head 1 connected to an extrusion nozzle 2 and supplied therefrom with thermoplastic material. The thermoplastic material is discharged from a nozzle 3 in a tubular or hose-shaped configuration in a vertical direction. The thermoplastic tubular section from which the container is formed is represented at 20.

A mold 5 shaped as a hollow body consists of a pair of oppositely movable mold parts 6 and 7 and abuts the lower face 4 of the extrusion head 1. A second molding device 8 corresponding with the mold 5 alternates with the mold 5 and encloses and abuts in an alternating manner the extruded hose segment.

The molds 5 and 8 alternatively open and close, in a manner known to those skilled in the art, to clamp the hose 20 during the blow molding process. For example, the mold parts 6,7 separate and are brought together during the molding operation to release a formed container and to clamp a next succeeding hose segment during the molding operation.

Coaxially with the discharge nozzle 3 of the extrusion head 1, there is formed an air blast channel 9 having a filling mandrel 10 centered therein. The channel 9 which provides air to effect the blow-molding operation, is suitable for supplying an air blast as well as for the supply of supporting air required for the abutment of a non-enclosed segment of the hose. The channel 9 may, upon appropriate rerouting, also be used for ventilation or rinsing of the shaped or molded hollow space of the hollow body.

An additional air blast channel 11 is disposed within the filling mandrel 10. The inner channel 11 is also suitable for draining the discharge pressure by appropriate rerouting of valves (not shown) within the space communicating therewith. For this purpose there is formed in a bottom wall 12 of the hollow mold 5 an opening 13. The bottom wall 5 is formed, in accordance with the embodiment illustrated in FIG. 1, with a slightly conical configuration tapering upwardly and inwardly of the mold 5 which serves simultaneously as a sealing seat, as well as for the abutment of the filling mandrel 10 which is movable in an axial direction slightly upwardly and downwardly.

The bottom wall 12 is also provided with a fillet 14 which is directed towards the interior of the hollow body and within which there are formed guided lateral welding elements 15 and 16 extending perpendicularly to the axis of the hollow body. These elements can be displaced by means of a piston 17 within a cylindrical space 18 for the purpose of welding, and if necessary also for separation, of two hollow bodies adhering to each other. The bottom wall 12 of the hollow body molding device 5 receives, for example, a part of a head region 21 to be shaped or molded. At this point, the upper front side of the container to be formed, as well as the lateral welding elements, are disposed within the bottom wall of the upper container, thereby resulting in the potentiality of a waste-free separation of the hollow bodies.

According to the more detailed view of the embodiment of the present invention shown in FIG. 2, a constriction 22 is formed in the upper region of the blow molds 5 and 8. An inner coating 23 on the constriction 22 forms with the outer surface of a part 24 of the filling mandrel 10 which comes in contact with the filling liquid, an annular gap 25 which is shown in dot-dash form. The annular gap 25 corresponds approximately to the thickness of the molded container segment, so that the molded container surface thereof facing the filling mandrel 10 fits approximately thereagainst and strips off the residue of filling liquid adhering thereto during the downward movement of the blow mold. Thus, the filling mandrel is stripped from any residue thereby avoiding disadvantages which could be caused by such residue during subsequent molding operations.

Above the construction 22 there is formed a circular recess 26 which serves to receive any surplus material which may result from subsequent sagging or slippage of the discharged segment of the hose. In FIG. 2 there is illustrated the initial position of the blow mold disposed under the extrusion head 1. In this position the constriction 22 is not yet in contact with the part 24 of the filling mandrel 10, which is surrounded upon completion of the filling process with liquid and which contains residues thereof during the withdrawing process.

The filling mandrel 10 is provided above the part 24 with a tapered or conical shape. The region which is still in a thermoplastic condition at the height of the constriction is therefore free, on the one hand, from the disturbing influences of interior or inner parts, and, on the other hand, an opening is formed which permits aerating and ventilation of the container space disposed thereunder. Only upon completion of the filling process and of the hardening stage resulting therefrom is the container disposed in the upper mold withdrawn from the extrusion head. At this time the inner coating of the already molded container comes into contact with the slightly thicker lower part 24 of the coating or surface of the filling mandrel 10 at the height of the constriction 22 and therefore all of the filling liquid residue from the container is stripped off.

The freely suspended segment of hose 20 supported by the supply of the supporting air from the channel 9 assumes a shape approximating that indicated by the dash-dot shape shown upon joining of both halves of the molds 6 and 7 of the upper hollow-body molding device 5. Thereby, there remains within the bottom wall 12 a through-opening 13′, which is closed upon the first formation of a hollow body by the transverse welding elements 15 and 16 so that a forming or shaping of the hose segment abutting against the walls of the molding halves 6 and 7 is accomplished. The front side of the filling mandrel 10 is disposed at the beginning of this process approximately at the height of the illustrated dash-dot line at 30 in order to enable movement thereof upon molding of the hollow body into the conically shaped bottom wall region. It is also possible to allow the filling mandrel to remain in its lower position. Upon unloading of the hollow space, the filling operation can commence and upon completion thereof the first hollow body molding device is moved in a closed state downwardly into the position of the molding device 8, which has, in the meantime, opened and which has assumed the upper position immediately below the extrusion head 1. Concurrently with downward movement of the molding device 5, the segment of the hose required for the next manufacturing process is extruded. At this time, the constriction 22 with the hose material adhering thereto also performs a stripping operation of the filling liquid residue adhering to the filling mandrel 10.

As soon as the molding devices 7 and 6 have reached their lower position, the molding halves of the molding device 8 may be moved toward one another. The hose segment 20 is surrounded thereby to be appropriately molded while still leaving an opening communicating with the head region 21 of the already filled hollow body. The consequently arising blasting pressure propagates through the openings 13, 13' up to the head region 21 of the already molded and filled container. Immediately thereafter, the filling mandrel 10, upon setting thereof on the centering surface of the bottom wall 12, insures a tight sealing engagement with respect to the opening 13 so that independently of the upper hollow body, a higher pressure may thereby be exerted or an unloading of the head region of the already filled hollow body may also be undertaken. At this time, the second hollow body is already molded and is being filled by the introduction of the filling liquid. As soon as an appropriate molding or shaping of the head region of the already filled container has been accomplished the transverse welding elements 15 and 16 move against the hose segment forming the opening 13 and close the latter so that the container may now be removed in a closed state from the mold. In the meantime the second container has also been filled, so that the filling mandrel moves back to its initial position. At this time, the molding halves of the lower molding device are opened and moved upwardly toward the hose head 1, while the second molding device is moved downwardly while it is still in a closed state. The hose segment, which is now surrounded or enclosed, as well as the head region of the already filled second hollow body are formed in the same manner and are subsequently closed.

While the specific embodiment of the invention has been shown and described in detail to illustrate the application of the inventive principles, it will be understood that the invention may be embodied otherwise without departing from such principles.

What is claimed is:

1. A method for removing undesired residue of a filling material from the filling mandrel in a machine for the manufacture, filling and closure of containers wherein filling material is inserted into the container by means of the filling mandrel, said machine comprising blow mold means shaped to form said container including separable mold parts, said method comprising the steps of extruding plastic material from an extrusion nozzle, clamping said mold parts about said extruded plastic material with said plastic material thereby extending within said blow mold means shaped to form the container, said blow mold means including a filling section and means defining a constriction formed in said blow mold means within a region generally above said filling section and adjacent thereto, locating within said plastic material within said blow mold means a filling mandrel having a outer diametral dimension smaller than said constriction to form therebetween an annular gap having a thickness approximately equivalent to the wall thickness of a segment of said container, forming said container in said blow mold means, filling said container with filling material through said filling mandrel with said mandrel being located below the level of the filling material during at least a substantial portion of the filling operation, moving said blow mold means relative to said filling mandrel to withdraw the filling mandrel from the blow means while said blow mold means is closed to separate the mandrel from said container while simultaneously stripping residue of the filling material adhering to the outer surface of the filling mandrel as the outer surface of the mandrel contacts a portion of the molded container in the constriction while passing the mandrel through the constriction by the relative movement of the mandrel from the blow mold means during separation of the mandrel from the container.

2. Apparatus for removing undesired residue of a filling material from the filling mandrel in a machine for the manufacture, filling and closure of containers wherein the filling material is inserted into the container by means of the filling mandrel, said apparatus comprising blow mold means shaped to form therein said container and including separable mold parts defining a filling section and means defining a constriction formed in said blow mold means within a region generally above said filling section and adjacent thereto, an extrusion nozzle for extruding plastic material from which said containers are formed, said separable mold parts operating to clamp said extruded material therebetween to enable formation therefrom of said containers within said blow mold means, a filling mandrel having an outer diametral dimension smaller than said constriction to form therebetween an annular gap having a thickness approximately equal to the wall thickness of a section of said container, said filling mandrel extending into said container after formation of said container within said blow mold means to introduce filling material therein with said mandrel being located below the level of the filling material during at least a substantial portion of the filling operation, said filling mandrel and said constriction being configured such that moving said blow mold means relative to said filling mandrel while said separable mold parts are clamped together to separate said mandrel from said container operates to strip residue of filling material adhering to the outer surface of said filling mandrel as the outer surface of the mandrel contacts a portion of the molded container in the constriction during the passage of said mandrel through said constriction while moving the blow mold means relative to the mandrel during separation of the mandrel from the container.

3. Apparatus according to claim 2 wherein the means forming said annular gap are constructed to enable variation of said annular gap.

4. An apparatus according to claim 3 wherein said constriction is formed by an interchangeable part of said mold.

5. An apparatus according to claim 2 wherein said filling mandrel comprises a tapered configuration above the maximum filling level of said filling material with respect to the lower part thereof, said filling mandrel forming an annular gap with the inner surface of said constriction for enabling aerating and ventilation.

* * * * *